United States Patent
Barbosa et al.

(10) Patent No.: US 11,648,757 B2
(45) Date of Patent: May 16, 2023

(54) MULTILAYER STRUCTURES HAVING IMPROVED RECYCLABILITY

(71) Applicant: Dow Global Technologies LLC, Midland, MI (US)

(72) Inventors: Felipe Dantas Barbosa, Sao Paulo (BR); Jorge Caminero Gomes, Sao Paulo (BR); Davidson Lütkenhaus, Sao Paulo (BR); Nicolas Cardoso Mazzola, Sao Paulo (BR)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 17/631,682

(22) PCT Filed: Jul. 23, 2020

(86) PCT No.: PCT/US2020/043241
§ 371 (c)(1),
(2) Date: Jan. 31, 2022

(87) PCT Pub. No.: WO2021/021551
PCT Pub. Date: Feb. 4, 2021

(65) Prior Publication Data
US 2022/0274385 A1 Sep. 1, 2022

Related U.S. Application Data

(60) Provisional application No. 62/881,734, filed on Aug. 1, 2019.

(51) Int. Cl.
*B32B 27/08* (2006.01)
*B29C 49/00* (2006.01)
(Continued)

(52) U.S. Cl.
CPC .......... *B32B 27/08* (2013.01); *B29C 49/0005* (2013.01); *B32B 1/02* (2013.01);
(Continued)

(58) Field of Classification Search
CPC ......... B32B 27/08; B32B 7/12; B32B 27/306; B32B 27/32; B32B 27/34
See application file for complete search history.

(56) References Cited

U.S. PATENT DOCUMENTS 3,264,272 A  8/1966 Richard
3,645,992 A  2/1972 Elston
(Continued)

FOREIGN PATENT DOCUMENTS

EP  129368 A1  12/1984
EP  260999 A1  3/1988
(Continued)

OTHER PUBLICATIONS

International Search Report and Written Opinion pertaining to PCT/US2020/043241, dated Sep. 30, 2020.
(Continued)

*Primary Examiner* — Michael C Miggins
(74) *Attorney, Agent, or Firm* — Dinsmore & Shohl LLP

(57) ABSTRACT

Embodiments of the present disclosure are directed to multilayer structures. The multilayer structures may include a first layer and a barrier layer. The first layer may include, based on the total weight of the first layer, from 90 wt. % to 99.5 wt. % of an ethylene/alpha-olefin interpolymer having a density of from 0.945 g/cc to 0.970 g/cc and from 0.5 wt. % to 10 wt. % of a compatibilizer. The compatibilizer may include an anhydride and/or carboxylic acid functionalized ethylene/alpha-olefin elastomer having a density of from 0.850 g/cc to 0.910 g/cc and a melt viscosity of greater than 200,000 cP, when measured at 177 C.

15 Claims, 5 Drawing Sheets

(51) Int. Cl.
  *B32B 1/02* (2006.01)
  *B32B 7/12* (2006.01)
  *B32B 27/30* (2006.01)
  *B32B 27/32* (2006.01)
  *B32B 27/34* (2006.01)
  *B29L 31/00* (2006.01)

(52) U.S. Cl.
  CPC ............. *B32B 7/12* (2013.01); *B32B 27/306* (2013.01); *B32B 27/32* (2013.01); *B32B 27/34* (2013.01); *B29L 2031/7158* (2013.01); *B32B 2250/03* (2013.01); *B32B 2272/00* (2013.01); *B32B 2305/70* (2013.01); *B32B 2307/7265* (2013.01)

(56) References Cited

U.S. PATENT DOCUMENTS

| | | | |
|---|---|---|---|
| 3,963,799 | A | 6/1976 | Starkweather |
| 4,076,698 | A | 2/1978 | Anderson et al. |
| 4,248,990 | A | 2/1981 | Pieski et al. |
| 4,351,931 | A | 9/1982 | Armitage |
| 4,701,432 | A | 10/1987 | Welborn, Jr. |
| 4,935,397 | A | 6/1990 | Chang |
| 4,937,301 | A | 6/1990 | Chang |
| 5,028,674 | A | 7/1991 | Hatch et al. |
| 5,055,438 | A | 10/1991 | Canich |
| 5,272,236 | A | 12/1993 | Lai et al. |
| 5,278,231 | A | 1/1994 | Chundury |
| 5,278,272 | A | 1/1994 | Lai et al. |
| 5,317,059 | A | 5/1994 | Chundury et al. |
| 5,346,963 | A | 9/1994 | Hughes et al. |
| 5,602,200 | A | 2/1997 | Wissmann |
| 5,986,028 | A | 11/1999 | Lai et al. |
| 6,054,544 | A | 4/2000 | Finlayson et al. |
| 6,335,410 | B1 | 1/2002 | Finlayson et al. |
| 6,723,810 | B2 | 4/2004 | Finlayson et al. |
| 7,183,005 | B2 | 2/2007 | Poloso et al. |
| 2006/0008604 | A1 | 1/2006 | Flat et al. |
| 2017/0348950 | A1 | 12/2017 | Parkinson et al. |

FOREIGN PATENT DOCUMENTS

| | | |
|---|---|---|
| EP | 3040199 A1 | 7/2016 |
| WO | 9007526 A1 | 7/1990 |
| WO | 9925742 A1 | 5/1999 |
| WO | 2018063578 A1 | 4/2018 |

OTHER PUBLICATIONS

Communication pursuant to Rules 161(1) and 162 EPC, dated Mar. 24, 2022, pertaining to EP application No. 20754498.2.

International Preliminary Report on Patentability pertaining to application No. PCT/US2020/043241.

Randall, Long-Chain Branching in Polyethylene, Rev. Macromol. Chem, 1989, pp. 285-297, C29 (2&3).

Rudin, Modern Methods of Polymer Characterization, John Wiley & Sons, New York, 1991 pp. 103-112.

Zimm, The Dimensions of Chain Molecules Containing Branches and Rings, Journal Chemical Physics, 1949, pp. 1301-1314, 17, 1301.

MULTILAYER STRUCTURES HAVING IMPROVED RECYCLABILITY

CROSS-REFERENCE TO RELATED APPLICATIONS

This application is a National Stage Entry under 35 U.S.C. § 371 of International Patent Application No. PCT/US2020/043241, filed Jul. 23, 2020, which claims priority to U.S. Provisional Patent Application No. 62/881,734, filed on Aug. 1, 2019, the entire disclosures of both of which are hereby incorporated by reference.

TECHNICAL FIELD

Embodiments described herein generally relate to ethylene-based polymer compositions and specifically relate to articles including the ethylene-based polymer compositions that provide improved barrier properties and improved toughness, comprising multimodal high density polyethylene (HDPE) and a compatibilizer.

BACKGROUND

High density polyethylene (HDPE) is often used in manufacturing molded articles, such as plastic bottles and containers, to achieve adequate stiffness. It is important for these articles to possess adequate stiffness, demonstrated by tensile modulus, to prevent deformation when stacked during transportation and storage and to prevent breakage if accidentally dropped. To achieve desired stiffness and barrier properties, commercially-produced articles, such as coextruded bottles, may conventionally include multilayer structures composed of an external layer of a conventional polyolefin (PO), a tie-layer of a functionalized polyethylene (MAH-grafted PE), and a polar polymer such as an ethylene vinyl alcohol copolymers (EVOH) or a polyamide (PA).

SUMMARY

However, these commercially-produced articles have poor recyclability due to the lack of compatibility between the polar and non-polar polymers in the layers of the multilayer structure. Typically, functional polymers used in barrier layers, such as ethylene vinyl alcohol (EVOH) or polyamide (PA) have difficulty dispersing within a more conventional polyolefin (PO) waste stream during a recycling process. Therefore, ongoing needs may exist for a multilayer structure with improved compatibility between the polar and non-polar polymers in the layers, which may lead to improved recyclability.

To meet these needs, compatibilizers can be used to provide compatibility between the polar polymer of the barrier layer and the non-polar polyolefin. Embodiments of the present disclosure meet those needs by providing a multilayer structure that may include a high density ethylene-based polymer (HDPE), a compatibilizer, and barrier layer including a polyamide or ethylene vinyl alcohol. As subsequently explained in more detail, the compatibilizers may be present high molecular weight and be MAH-grafted. Therefore, when a multilayer structure with the composition described herein is recycled, it may exhibit improved properties, such as improved impact resistance at 23° C. and −30° C., when compared to a composition that does not have a built in compatibilizer with the polyolefin.

According to at least one embodiment of the present disclosure, a multilayer structure is provided. The multilayer structure may include a first layer and a barrier layer. The first layer may include, based on the total weight of the first layer, from 90 wt. % to 99.5 wt. % of an ethylene/alpha-olefin interpolymer having a density of from 0.945 g/cc to 0.970 g/cc and from 0.5 wt. % to 10 wt. % of a compatibilizer. The compatibilizer may include an anhydride and/or carboxylic acid functionalized ethylene/alpha-olefin elastomer having a density of from 0.850 g/cc to 0.910 g/cc and a melt viscosity of greater than 200,000 cP, when measured at 177° C.

According to at least one embodiment of the present disclosure, a method for making a recycled structure is provided. The method may include converting a multilayer structure into flakes and forming the flakes into the recycled structure. The multilayer structures may include a first layer and a barrier layer. The first layer may include, based on the total weight of the first layer, from 90 wt. % to 99.5 wt. % of an ethylene/alpha-olefin interpolymer having a density of from 0.945 g/cc to 0.970 g/cc and from 0.5 wt. % to 10 wt. % of a compatibilizer. The compatibilizer may include an anhydride and/or carboxylic acid functionalized ethylene/alpha-olefin elastomer having a density of from 0.850 g/cc to 0.910 g/cc and a melt viscosity of greater than 200,000 cP, when measured at 177° C.

As such, embodiments of the present disclosure may provide compatibility between the polar and non-polar polymers in the layers of the multilayer structure, allowing for a multilayer structure with improved recyclability.

These and other embodiments are described in more detail in the following Detailed Description in conjunction with the appended drawings.

BRIEF DESCRIPTION OF THE DRAWINGS

The following detailed description of specific embodiments of the present disclosure can be best understood when read in conjunction with the following drawings, where like structure is indicated with like reference numerals and in which.

DETAILED DESCRIPTION

Specific embodiments of the present application will now be described. These embodiments are provided so that this disclosure will be thorough and complete and will fully convey the scope of the subject matter to those skilled in the art.

The term "polymer" refers to a polymeric compound prepared by polymerizing monomers, whether of a same or a different type. The generic term polymer thus embraces the term "homopolymer," which usually refers to a polymer prepared from only one type of monomer as well as "copolymer," which refers to a polymer prepared from two or more different monomers. The term "interpolymer," as used herein, refers to a polymer prepared by the polymerization of at least two different types of monomers. The generic term interpolymer thus includes a copolymer or polymer prepared from more than two different types of monomers, such as terpolymers. As used herein, the term "elastomer" refers to a polymer which can return to its initial dimensions when deformed by an external force.

"Polyethylene" or "ethylene-based polymer" shall mean polymers comprising greater than 50% by mole of units derived from ethylene monomer. This includes ethylene-based homopolymers or copolymers (meaning units derived from two or more comonomers). Common forms of ethylene-based polymers known in the art include, but are not limited to, Low Density Polyethylene (LDPE); Linear Low Density Polyethylene (LLDPE); Ultra Low Density Polyethylene (ULDPE); Very Low Density Polyethylene (VLDPE); single-site catalyzed Linear Low Density Polyethylene, including both linear and substantially linear low density resins (m-LLDPE); Medium Density Polyethylene (MDPE); and High Density Polyethylene (HDPE). Ethylene copolymers may be produced by processes well known in the polymer art using either autoclave or tubular reactors. The copolymerization can be run as a continuous process in an autoclave as disclosed in U.S. Pat. Nos. 3,264,272; 4,351,931; 4,248,990; and 5,028,674 and International Patent Application WO99/25742.

"Multilayer article" means any structure having more than one layer. For example, the multilayer article may have three or more layers. A multilayer article may be described as having the layers designated with letters. For example, a three layer structure designated as A/B/C may have a core layer, B, and two external layers, A and C. In other embodiments, a three layer structure designated as A/B/C may have a first layer, A, a second layer, B, and a third layer, C. Likewise, a structure having two core layers, B and C, and two external layers, A and D, may be designated A/B/C/D. As subsequently described in more detail, the multilayer article may be a bottle.

Figure 1:
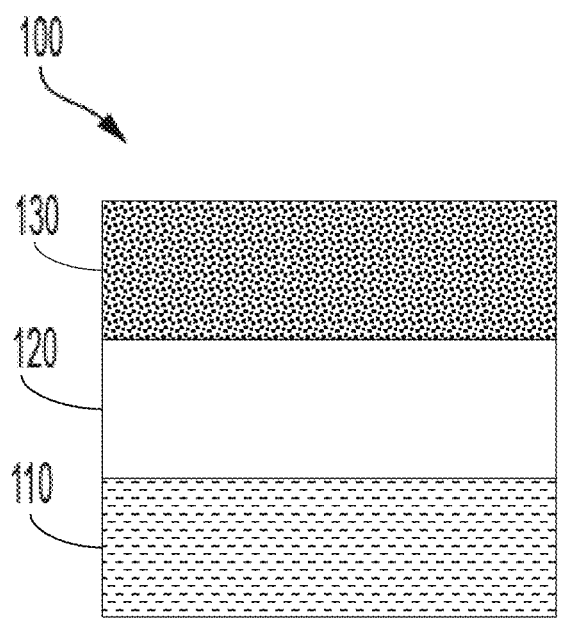
FIG. 1 is a schematic depiction of a multilayer structure, in accordance with one or more embodiments of the present disclosure.

Reference will now be made in detail to embodiments of the multilayer article 100 depicted in FIG. 1. The multilayer article 100 may include a first layer 110 and a barrier layer 130. Disposed between the first layer 110 and the barrier layer 130 may be a tie layer 120. Without being bound by theory, it is believed that a compatibilizer included in the first layer 110 of the multilayer article 100 may allow for improved recyclability of the multilayer article.

In embodiments, the first layer 110 may include an ethylene/alpha-olefin interpolymer. In further embodiments, the ethylene/alpha-olefin interpolymer may be a high density ethylene-based polymer (HDPE). In accordance with one or more embodiments of the present disclosure, the HDPE may have a density from about 0.940 g/cm$^3$ to about 0.970 g/cm$^3$ when measured according to ASTM D792. In other embodiments, the HDPE may have a density from about 0.940 g/cm$^3$ to about 0.970 g/cm$^3$, or from about 0.940 g/cm$^3$ to about 0.965 g/cm$^3$, or from about 0.940 g/cm$^3$ to about 0.960 g/cm$^3$, or from about 0.940 g/cm$^3$ to about 0.955 g/cm$^3$, or from about 0.945 g/cm$^3$ to about 0.970 g/cm$^3$, or from about 0.945 g/cm$^3$ to about 0.965 g/cm$^3$, or from about 0.945 g/cm$^3$ to about 0.960 g/cm$^3$, or from about 0.945 g/cm$^3$ to about 0.955 g/cm$^3$, or from about 0.950 g/cm$^3$ to about 0.970 g/cm$^3$, or from about 0.950 g/cm$^3$ to about 0.965 g/cm$^3$, or from about 0.950 g/cm$^3$ to about 0.960 g/cm$^3$, or from about 0.950 g/cm$^3$ to about 0.955 g/cm$^3$, or from about 0.955 g/cm$^3$ to about 0.970 g/cm$^3$, or from about 0.955 g/cm$^3$ to about 0.965 g/cm$^3$, or from about 0.955 g/cm$^3$ to about 0.960 g/cm$^3$.

In accordance with one or more embodiments of the present disclosure, the ethylene/alpha-olefin interpolymer may have a melt index ($I_2$) of about 0.1 grams per 10 minutes (g/10 min) to about 45.0 g/10 min, when measured at 190° C. and 2.16 kg according to ASTM D1238. In some embodiments, the ethylene/alpha-olefin interpolymer may have a melt index from about 0.2 g/10 min to about 40.0 g/10 min, from about 0.2 g/10 min to about 30.0 g/10 min, from about 0.2 g/10 min to about 20.0 g/10 min, from about 0.2 g/10 min to about 10.0 g/10 min, from about 0.2 g/10 min to about 1.0 g/10 min, from about 1.0 g/10 min to about 45.0 g/10 min, from about 1.0 g/10 min to about 30.0 g/10 min, from about 1.0 g/10 min to about 20.0 g/10 min, from about 1.0 g/10 min to about 10.0 g/10 min, from about 1.0 g/10 min to about 5.0 g/10 min, from about 10 g/10 min to about 45.0 g/10 min, from about 10.0 g/10 min to about 20.0 g/10 min, from about 10.0 g/10 min to about 15.0 g/10 min, from about 15.0 g/10 min to about 40.0 g/10 min, or from about 15.0 g/10 min to about 20.0 g/10 min.

Various commercial embodiments are considered suitable for the ethylene/alpha-olefin interpolymer. For example, a suitable polymeric core layer may include a HDPE that is commercially available from The Dow Chemical Company, Midland, Mich. under the trademark DOW™ HDPE 40055L.

The first layer 110 may include from about 90 wt. % to about 99.5 wt. % of the ethylene/alpha-olefin interpolymer, based on the total weight of the first layer 110. In other embodiments, the first layer 110 may include from about 90 wt. % to about 99.5 wt. %, from about 90 wt. % to about 98 wt. %, from about 90 wt. % to about 96 wt. %, from about 90 wt. % to about 94 wt. %, from about 90 wt. % to about 92 wt. %, from about 92 wt. % to about 99.5 wt. %, from about 92 wt. % to about 98 wt. %, from about 92 wt. % to about 96 wt. %, from about 92 wt. % to about 94 wt. %, from about 94 wt. % to about 99.5 wt. %, from about 94 wt. % to about 98 wt. %, from about 94 wt. % to about 96 wt. %, from about 96 wt. % to about 99.5 wt. %, from about 96 wt. % to about 98 wt. %, or from about 98 wt. % to about 99.5 wt. % of the ethylene/alpha-olefin interpolymer, based on the total weight of the first layer 110.

In embodiments, the first layer 110 may include a compatibilizer. The compatibilizer may be an anhydride and/or carboxylic acid functionalized ethylene/alpha-olefin elastomer. The anhydride and/or carboxylic acid functionalized ethylene/alpha-olefin elastomer may be a base polymer with an anhydride and/or carboxylic acid grafting monomer grafted thereto.

The base polymer used to form the anhydride and/or carboxylic acid functionalized ethylene/alpha-olefin elastomer may be an ethylene/α-olefin interpolymer. In various embodiments, the alpha olefins may be $C_3$-$C_{20}$ alpha(α)-olefins. Any and all ranges between $C_3$ and $C_{20}$ are included herein and disclosed herein, for example, the α-olefins are $C_3$-$C_{10}$ α-olefins. Examples of α-olefins that may be used include, but are not limited to propylene, 1-butene, methyl-1-pentene, 1-pentene, 1-hexene, 1-heptene and 1-octene, 1-decene, 1-dodecene, 1-tetradecene, 1-hexadecene, and 1-octadecene, and more preferably include propylene, 1-butene, 1-hexene and 1-octene. The α-olefins can also include a cyclic structure such as cyclohexane or cyclopentane, resulting in an α-olefin such as 3-cyclohexyl-1-propene (allyl cyclohexane) and vinyl cyclohexane. Although not α-olefins in the classical sense of the term, for purposes of this disclosure, certain cyclic olefins, such as norbornene and related olefins, are α-olefins and can be used in place of some or all of the α-olefins described above. Similarly, styrene and its related olefins (for example, α-methylstyrene, etc.) are α-olefins for purposes of this disclosure.

In one embodiment, the ethylene/α-olefin interpolymer may be a homogeneously branched linear interpolymer, and further a copolymer, or a homogeneous branched substantially linear interpolymer, and further a copolymer. The terms "homogeneous" and "homogeneously-branched" are used in reference to an ethylene/α-olefin interpolymer, in which the α-olefin comonomer is randomly distributed within a given polymer molecule, and all of the polymer molecules have the same or substantially the same comonomer-to-ethylene ratio.

The homogeneously branched linear ethylene interpolymers are ethylene polymers, which lack long chain branching, but do have short chain branches, derived from the comonomer polymerized into the interpolymer, and which are homogeneously distributed, both within the same polymer chain, and between different polymer chains. These ethylene/α-olefin interpolymers may have a linear polymer backbone, no measurable long chain branching, and a narrow molecular weight distribution. This class of polymers is disclosed, for example, by Elston in U.S. Pat. No. 3,645,992, and subsequent processes to produce such polymers, using bis-metallocene catalysts, have been developed, as shown, for example, in EP 0 129 368; EP 0 260 999; U.S. Pat. Nos. 4,701,432; 4,937,301; 4,935,397; 5,055,438; and WO 90/07526; each incorporated herein by reference. As discussed, the homogeneously branched linear ethylene interpolymers lack long chain branching, just as is the case for the linear low density polyethylene polymers or linear high density polyethylene polymers. Commercial examples of homogeneously branched linear ethylene/α-olefin interpolymers include TAFMER polymers from the Mitsui Chemical Company, and EXACT and EXCEED polymers from ExxonMobil Chemical Company.

Illustrative homogeneously branched ethylene/alpha-olefin copolymers include ethylene/propylene, ethylene/butene, ethylene/1-hexene, ethylene/1-octene, ethylene/styrene, and the like. Illustrative terpolymers include ethylene/propylene/1-octene, ethylene/propylene/butene, ethylene/butene/1-octene, and ethylene/butene/styrene. More specific examples of homogeneously branched ethylene/alpha-olefin interpolymers include homogeneously branched, linear ethylene/α-olefin copolymers (e.g. TAFMER® by Mitsui Petrochemicals Company Limited and EXACT® by Exxon Chemical Company), and the homogeneously branched, substantially linear ethylene/α-olefin polymers (e.g., AFFINITY™ and ENGAGE™ polyethylene available from The Dow Chemical Company). The homogeneously branched substantially linear ethylene/α-olefin interpolymers are described in U.S. Pat. Nos. 5,272,236; 5,278,272; 5,986,028; 6,054,544; 6,335,410 and 6,723,810; each incorporated herein by reference. The substantially linear ethylene/α-olefin interpolymers have long chain branching. The long chain branches have the same comonomer distribution as the polymer backbone, and can have about the same length as the length of the polymer backbone. "Substantially linear," typically, is in reference to a polymer that is substituted, on average, with "0.01 long chain branches per 1000 carbons" to "3 long chain branches per 1000 carbons." The length of a long chain branch is longer than the carbon length of a short chain branch, formed from the incorporation of one comonomer into the polymer backbone.

Some polymers may be substituted with 0.01 long chain branches per 1000 total carbons to 3 long chain branch per 1000 total carbons, further from 0.01 long chain branches per 1000 total carbons to 2 long chain branch per 1000 total carbons, and further from 0.01 long chain branches per 1000 total carbons to 1 long chain branch per 1000 total carbons.

The substantially linear ethylene/α-olefin interpolymers form a unique class of homogeneously branched ethylene polymers. They differ substantially from the well-known class of conventional, homogeneously branched linear ethylene/α-olefin interpolymers, as discussed above, and, moreover, they are not in the same class as conventional heterogeneous "Ziegler-Natta catalyst polymerized" linear ethylene polymers (for example, ultra low density polyethylene (ULDPE), linear low density polyethylene (LLDPE) or high density polyethylene (HDPE), made, for example, using the technique disclosed by Anderson et al., in U.S. Pat. No. 4,076,698); nor are they in the same class as high pressure, free-radical initiated, highly branched polyethylenes, such as, for example, low density polyethylene (LDPE), ethylene-acrylic acid (EAA) copolymers and ethylene vinyl acetate (EVA) copolymers.

The homogeneously branched, substantially linear ethylene/α-olefin interpolymers may have excellent processability, even though they have a relatively narrow molecular weight distribution. Surprisingly, the melt flow ratio ($I_{10}/I_2$), according to ASTM D 1238, of the substantially linear ethylene interpolymers can be varied widely, and essentially independently of the molecular weight distribution (Mw/Mn or MWD). This surprising behavior is contrary to conventional homogeneously branched linear ethylene interpolymers, such as those described, for example, by Elston in U.S. Pat. No. 3,645,992, and heterogeneously branched, conventional "Ziegler-Natta polymerized," linear polyethylene interpolymers, such as those described, for example, by Anderson et al., in U.S. Pat. No. 4,076,698. Unlike substantially linear ethylene interpolymers, linear ethylene interpolymers (whether homogeneously or heterogeneously branched) have rheological properties, such that, as the molecular weight distribution increases, the 110/12 value also increases.

Long chain branching can be determined by using 13C Nuclear Magnetic Resonance (NMR) spectroscopy, and can be quantified using the method of Randall (Rev. Macromol. Chem. Phys., C29 (2 &3), 1989, p. 285-297), the disclosure of which is incorporated herein by reference. Two other methods are Gel Permeation Chromatography, couple with a Low Angle Laser Light Scattering detector (GPCLALLS), and Gel Permeation Chromatography, coupled with a Differential Viscometer detector (GPC-DV). The use of these techniques for long chain branch detection, and the underlying theories, have been well documented in the literature. See, for example, Zimm, B. H. and Stockmayer, W. H., J. Chem. Phys., 17, 1301 (1949), and Rudin, A., Modern Methods of Polymer Characterization, John Wiley & Sons, New York (1991) pp. 103-112.

In contrast to "substantially linear ethylene polymer," "linear ethylene polymer" means that the polymer lacks measurable or demonstrable long chain branches, that is, the polymer is substituted with an average of less than 0.01 long chain branch per 1000 carbons.

An example of an ethylene/α-olefin copolymer is AFFINITY™ GA Polyolefin Plastomer available from The Dow Chemical Company, and LICOCENE Performance Polymers from Clariant. Other examples of ethylene/α-olefin polymers suitable include the ultra low molecular weight ethylene polymers described in U.S. Pat. Nos. 6,335,410, 6,054,544 and 6,723,810, each fully incorporated herein by reference.

In one or more embodiments, the anhydride and/or carboxylic acid functionalized ethylene/alpha-olefin elastomer comprises up to 10 wt. %, up to 5 wt. %, or from 1 to 4 wt. % of the anhydride and/or carboxylic acid grafting monomer, based on the total weight of the anhydride and/or carboxylic acid functionalized ethylene/alpha-olefin elastomer. The weight percentage of the ethylene-based polymer is complementary to the amount of anhydride and/or carboxylic acid grafting monomer, so that the sum of the weight percentages of the ethylene-based polymer and the anhydride and/or carboxylic acid functionalized monomer is 100 wt. %. Thus, the anhydride and/or carboxylic acid functionalized ethylene/alpha-olefin elastomer comprises up to 90 wt. %, up to 95 wt. %, or from 96 to 99 wt. %, based on the total weight of the anhydride and/or carboxylic acid functionalized ethylene/alpha-olefin elastomer, of the ethylene-based polymer.

In one embodiment, the anhydride and/or carboxylic acid grafting monomer is grafted to the polyolefin. Examples of anhydride grafting moieties may include but are not limited to, maleic anhydride, citraconic anhydride, 2-methyl maleic anhydride, 2-chloromaleic anhydride, 2,3-dimethylmaleic anhydride, bicyclo[2,2,1]-5-heptene-2,3-dicarboxylic anhydride and 4-methyl-4-cyclohexene-1,2-dicarboxylic anhydride, bicyclo(2.2.2)oct-5-ene-2,3-dicarboxylic acid anhydride, lo-octahydronaphthalene-2,3-dicarboxylic acid anhydride, 2-oxa-1,3-diketospiro(4.4)non-7-ene, bicyclo (2.2.1)hept-5-ene-2,3-dicarboxylic acid anhydride, tetrahydrophtalic anhydride, norbom-5-ene-2,3-dicarboxylic acid anhydride, nadic anhydride, methyl nadic anhydride, himic anhydride, methyl himic anhydride, and x-methyl-bi-cyclo (2.2.1)hept-5-ene-2,3-dicarboxylic acid anhydride. In one embodiment, the anhydride grafting moiety comprises maleic anhydride.

In further embodiments, the anhydride and/or carboxylic acid functionalized ethylene/alpha-olefin elastomer has a density less than about 0.910 grams per cubic centimeter (g/cc), or from about 0.850 g/cc to about 0.910 g/cc, as measured according to ASTM Method No. D792-91. Other density ranges may be from about 0.850 g/cc to about 0.900 g/cc, from about 0.850 g/cc to about 0.880, from about 0.850 g/cc to about 0.860 g/cc, from about 0.860 g/cc to about 0.910 g/cc, from about 0.860 g/cc to about 0.880 g/cc, from about 0.880 g/cc to about 0.910, or from about 0.880 to about 0.900.

In one or more embodiments, the anhydride and/or carboxylic acid functionalized ethylene/alpha-olefin elastomer may have a melt index ($I_2$) of about 1 grams per 10 minutes (g/10 min) to about 800 g/10 min, from about 1 g/10 min to about 600 g/10 min, from about 1 g/10 min to about 300 g/10 min, from about 1 g/10 min to about 200 g/10 min, from about 1 g/10 min to about 100 g/10 min, or from about 1 g/10 min to about 50 g/10 min as determined in accordance with ASTM method D1238 at 190° C. and 2.16 kg.

In one or more embodiments, the anhydride and/or carboxylic acid functionalized ethylene/alpha-olefin elastomer may have a melt viscosity of greater than 200,000 cP when measured at 177° C. according to the test methods described subsequently in this disclosure. In other embodiments, the anhydride and/or carboxylic acid functionalized ethylene/ alpha-olefin elastomer may have a melt viscosity of from about 200,000 cP to about 3,000,000 cP, from about 200,000 cP to about 1,000,000 cP, from about 200,000 cP to about 500,000 cP, from about 500,000 cP to about 3,000,000 cP, from about 500,000 cP to about 1,000,000 cP, or from about 1,000,000 cP to about 3,000,000 cP when measured at 177° C. according to the test methods described subsequently in this disclosure. Without being bound by theory, it is believed the melt viscosity of greater than 200,000 cP when measured at 177° C. may provide compatibility between the polar and non-polar polymers in the layers of the multilayer structure, allowing for a multilayer structure with improved recyclability.

In one embodiment, the anhydride and/or carboxylic acid functionalized ethylene/alpha-olefin elastomer has a molecular weight distribution (MWD) (Mw/Mn) from 1.1 to 5.0. Any and all ranges from 1.1 to 5.0 are included herein and are disclosed herein, for example, the anhydride and/or carboxylic acid functionalized ethylene/alpha-olefin elastomer can have a MWD of from 1.3 to 4.0, 1.5 to 2.8, or 2.0 to 2.5, or from 2.0 to 3.0.

In one embodiment, the anhydride and/or carboxylic acid functionalized ethylene/alpha-olefin elastomer has a weight average molecular weight (Mw) in the range of from 2000 g/mole to 80,000 g/mole. Any and all ranges from 2000 g/mole to 80,000 g/mole are included herein and disclosed herein, for example, the anhydride and/or carboxylic acid functionalized ethylene/alpha-olefin elastomer can have a Mw in the range of from 3000 g/mole to 50,000 g/mole, or from 4000 g/mole to 40,000 g/mole.

In one embodiment, the anhydride and/or carboxylic acid functionalized ethylene/alpha-olefin elastomer has a percent crystallinity, as determined by DSC, in the range of from 2 percent to 40 percent. Percent crystallinity is determined by differential scanning calorimetry using a Perkin-Elmer DSC 7. The percent crystallinity may be calculated with the equation:

$$\% C = (A/292 \text{ J/g}) \times 100,$$

wherein % C represents the percent crystallinity and A represents the heat of fusion of the ethylene in Joules per gram (J/g). Any and all ranges from 2% to 40% are included herein and disclosed herein, for example, the anhydride and/or carboxylic acid functionalized ethylene/alpha-olefin elastomer can have a percent crystallinity in the range of from 5% to 30%, from 10% to 25%, or from 15% to 20%.

Various commercial embodiments are considered suitable. For example, suitable anhydride and/or carboxylic acid functionalized ethylene/alpha-olefin elastomer may be commercially available from The Dow Chemical Company under the trademark AMPLIFY™ TY 1060H.

Various amounts of the anhydride and/or carboxylic acid functionalized ethylene/alpha-olefin elastomer are contemplated as suitable within the first layer 110. In embodiments, the first layer 110 may include from 10 wt. % or less anhydride and/or carboxylic acid functionalized ethylene/ alpha-olefin elastomer, based on the total weight of the first layer 110. In other embodiments, the first layer 110 may include from about 0.5 wt. % to about 10 wt. %, from about 0.5 wt. % to about 5 wt. %, or from about 5 wt. % to about 10 wt. % anhydride and/or carboxylic acid functionalized ethylene/alpha-olefin elastomer, based on the total weight of the first layer 110.

Without being bound by theory, it is believed that, when recycled, the anhydride and/or carboxylic acid functionalized ethylene/alpha-olefin elastomer may act as a compatibilizer to provide compatibility between the polar polymer of the barrier layer 130 and the non-polar polyolefins of the first layer to provide the multilayer structure 100 with improved recyclability.

In some embodiments, the thickness of the first layer 110 may be from about 300 microns to about 2500 microns. In some embodiments, the thickness of the first layer 110 may be from about 300 microns to about 2000 microns, from about 300 microns to about 1500 microns, from about 300 microns to about 1000 microns, from about 300 microns to about 500 microns, from about 500 microns to about 2500 microns, from about 500 microns to about 2000 microns, from about 500 microns to about 1500 microns, from about 500 microns to about 1000 microns, from about 1000 microns to about 2500 microns, from about 1000 microns to about 2000 microns, from about 1000 microns to about 1500 microns, from about 1500 microns to about 2500 microns, from about 1500 microns to about 2000 microns, or from about 2000 microns to about 2500 microns.

As previously mentioned, multilayer structure 100 may include a barrier layer 130. Without being bound by theory, the barrier layer 130 may aid in providing chemical resistance and prevent moisture, light, and oxygen transmission. In one or more embodiments, the barrier layer 130 may include polar polymers selected from polyamides (PA), ethylene vinyl alcohol copolymers (EVOH), or combinations thereof. In another embodiment, the polar polymer comprises polyamide. In another embodiment, the polar polymer comprises EVOH.

Various embodiments are contemplated for the polyamide. In embodiments, the polyamide may include Nylon 6, Nylon 6,6, or combinations thereof. In another embodiment, the polyamide comprises polymeric units derived from hexamethylene diamine, adipic acid, and caprolactam. Various commercial embodiments are considered suitable for the polyamide. For example, suitable polyamides utilized in barrier layer 130 may be commercially available as ULTRAMID C40 01 from BASF.

The barrier layer 130 may include from about 90 wt. % to about 99.5 wt. % polyamide, based on the total weight of the barrier layer 130. In other embodiments, the barrier layer 130 may include from about 90 wt. % to about 98 wt. %, from about 90 wt. % to about 96 wt. %, from about 90 wt. % to about 94 wt. %, from about 90 wt. % to about 92 wt. %, from about 92 wt. % to about 99.5 wt. %, from about 92 wt. % to about 98 wt. %, from about 92 wt. % to about 96 wt. %, from about 92 wt. % to about 94 wt. %, from about 94 wt. % to about 99.5 wt. %, from about 94 wt. % to about 98 wt. %, from about 94 wt. % to about 96 wt. %, from about 96 wt. % to about 99.5 wt. %, from about 96 wt. % to about 98 wt. %, or from about 98 wt. % to about 99.5 wt. % polyamide, based on the total weight of the barrier layer 130.

Various embodiments are contemplated for the EVOH. Commercial embodiments of the ethylene vinyl alcohol may include EVAL™ H171B supplied by EVAL Europe and Kuraray. Other EVOH polymers may include EVAL™ E171B or EVAL™ L171B also supplied by EVAL Europe and Kuraray.

The barrier layer 130 may include from about 90 wt. % to about 99.5 wt. % of the ethylene vinyl alcohol copolymer, based on the total weight of the barrier layer 130. In other embodiments, the barrier layer 130 may include from about 90 wt. % to about 98 wt. %, from about 90 wt. % to about 96 wt. %, from about 90 wt. % to about 94 wt. %, from about 90 wt. % to about 92 wt. %, from about 92 wt. % to about 99.5 wt. %, from about 92 wt. % to about 98 wt. %, from about 92 wt. % to about 96 wt. %, from about 92 wt. % to about 94 wt. %, from about 94 wt. % to about 99.5 wt. %, from about 94 wt. % to about 98 wt. %, from about 94 wt. % to about 96 wt. %, from about 96 wt. % to about 99.5 wt. %, from about 96 wt. % to about 98 wt. %, or from about 98 wt. % to about 99.5 wt. % of the ethylene vinyl alcohol copolymer, based on the total weight of the barrier layer 130.

In embodiments, the thickness of the barrier layer 130 may be from about 10 microns to about 100 microns. In additional embodiments, the thickness of the barrier layer 130 may be from about 10 microns to about 100 microns, from about 10 microns to about 80 microns, from about 10 microns to about 60 microns, from about 10 microns to about 40 microns, from about 10 microns to about 20 microns, from about 20 microns to about 100 microns, from about 20 microns to about 80 microns, from about 20 microns to about 60 microns, from about 20 microns to about 40 microns, from about 40 microns to about 100 microns, from about 40 microns to about 80 microns, from about 40 microns to about 60 microns, from about 60 microns to about 100 microns, from about 60 microns to about 80 microns, or from about 80 microns to about 100 microns.

As previously mentioned, multilayer structure 100 may include a tie layer 120. Without being bound by theory, tie layers may be utilized to adhere polyolefin-based layers to one or more barrier layers that include polar polymers. In the presently-disclosed multilayer structure 100, the tie layer 120 may adhere the first layer 110 to the barrier layer 130.

In embodiments, the tie layer 120 may include an anhydride and/or carboxylic acid functionalized ethylene/alpha-olefin interpolymer. In embodiments, the anhydride and/or carboxylic acid functionalized ethylene/alpha-olefin interpolymer, as used herein, includes an ethylene/alpha-olefin interpolymer that comprises at least one anhydride group linked by a covalent bond. The anhydride and/or carboxylic acid functionalized ethylene/alpha-olefin interpolymer may be an ethylene-based polymer with an anhydride and/or carboxylic acid grafting monomer grafted thereto. Suitable ethylene-based polymers for the low-melt viscosity maleic anhydride and/or carboxylic acid functionalized polyolefin include, without limitation, polyethylene homopolymers and copolymers with α-olefins, copolymers of ethylene and vinyl acetate, and copolymers of ethylene and one or more alkyl (meth)acrylates. In specific embodiments, the anhydride and/or carboxylic acid functionalized ethylene/alpha-olefin interpolymer may comprise a maleic anhydride-grafted linear low density polyethylene (LLDPE).

In one or more embodiments, the anhydride and/or carboxylic acid functionalized ethylene/alpha-olefin interpolymer comprises up to 10 wt. %, up to 5 wt. %, or from 1 to 4 wt. % of the anhydride and/or carboxylic acid grafting monomer, based on the total weight of the anhydride and/or carboxylic acid functionalized ethylene/alpha-olefin interpolymer. The weight percentage of the ethylene-based polymer is complementary to the amount of anhydride and/or carboxylic acid grafting monomer, so that the sum of the weight percentages of the ethylene-based polymer and the anhydride- and/or carboxylic acid-grafted monomer is 100 wt. %. Thus, the anhydride-grafted ethylene/alpha-olefin interpolymer comprises up to 90 wt. %, up to 95 wt. %, or from 96 to 99 wt. %, based on the total weight of the maleic anhydride-grafted polyolefin, of the ethylene-based polymer.

Examples of anhydride grafting moieties may include but are not limited to, maleic anhydride, citraconic anhydride, 2-methyl maleic anhydride, 2-chloromaleic anhydride, 2,3-dimethylmaleic anhydride, bicyclo[2,2,1]-5-heptene-2,3-dicarboxylic anhydride and 4-methyl-4-cyclohexene-1,2-dicarboxylic anhydride, bicyclo(2.2.2)oct-5-ene-2,3-dicarboxylic acid anhydride, lo-octahydronaphthalene-2,3-dicarboxylic acid anhydride, 2-oxa-1,3-diketospiro(4.4)non-7-ene, bicyclo(2.2.1)hept-5-ene-2,3-dicarboxylic acid anhydride, tetrahydrophtalic anhydride, norborn-5-ene-2,3-dicarboxylic acid anhydride, nadic anhydride, methyl nadic anhydride, himic anhydride, methyl himic anhydride, and x-methyl-bi-cyclo(2.2.1)hept-5-ene-2,3-dicarboxylic acid anhydride. In one embodiment, the anhydride grafting moiety comprises maleic anhydride.

In further embodiments, the anhydride and/or carboxylic acid functionalized ethylene/alpha-olefin interpolymer has a density less than about 0.940 grams per cubic centimeter (g/cc), or from about 0.855 g/cc to about 0.940 g/cc, as measured according to ASTM Method No. D792-91. Other density ranges may be from about 0.855 g/cc to about 0.900 g/cc, from about 0.855 g/cc to about 0.880, from about 0.855 g/cc to about 0.860 g/cc, from about 0.860 g/cc to about 0.940 g/cc, from about 0.860 g/cc to about 0.910 g/cc, from about 0.860 g/cc to about 0.880 g/cc, from about 0.880 g/cc to about 0.910, or from about 0.880 to about 0.900.

In one or more embodiments, the anhydride and/or carboxylic acid functionalized ethylene/alpha-olefin interpolymer may have a melt index ($I_2$) of about 1 grams per 10 minutes (g/10 min) to about 300 g/10 min, from about 1 g/10 min to about 200 g/10 min, from about 1 g/10 min to about 100 g/10 min, from about 1 g/10 min to about 50 g/10 min, or from about 1 g/10 min to about 10 g/10 min as determined in accordance with ASTM method D1238 at 190° C. and 2.16 kg.

In one or more embodiments, the anhydride and/or carboxylic acid functionalized ethylene/alpha-olefin interpolymer may have a melt viscosity of less than 200,000 cP when measured at 177° C. according to the test methods described subsequently in this disclosure. In other embodiments, the anhydride and/or carboxylic acid functionalized ethylene/alpha-olefin interpolymer may have a melt viscosity of from about 2,000 cP to about 200,000 cP, from about 2,000 cP to about 100,000 cP, from about 2,000 cP to about 50,000 cP, from about 2,000 cP to about 10,000 cP, from about 10,000 cP to about 200,000 cP, from about 10,000 cP to about 100,000 cP, from about 10,000 cP to about 50,000 cP, from about 50,000 cP to about 200,000 cP, from about 50,000 cP to about 100,000 cP, or from about 100,000 cP to about 200,000 cP when measured at 177° C. according to the test methods described subsequently in this disclosure.

Various commercial embodiments are considered suitable. For example, suitable anhydride and/or carboxylic acid functionalized ethylene/alpha-olefin interpolymers may be commercially available from The Dow Chemical Company under the trademark AMPLIFY™ TY 1353H and AMPLIFY™ TY 1057H.

Various amounts of the anhydride and/or carboxylic acid functionalized ethylene/alpha-olefin interpolymer are contemplated as suitable within the tie layer 120. In embodiments, the tie layer 120 may include from 10 wt. % or less anhydride and/or carboxylic acid functionalized ethylene/alpha-olefin interpolymer, based on the total weight of the tie layer 120. In other embodiments, the tie layer 120 may include from about 0.5 wt. % to about 10 wt. %, from about 0.5 wt. % to about 5 wt. %, or from about 5 wt. % to about 10 wt. % anhydride and/or carboxylic acid functionalized ethylene/alpha-olefin interpolymer, based on the total weight of the tie layer 120.

Without being bound by theory, it is believed that the anhydride and/or carboxylic acid functionalized ethylene/alpha-olefin interpolymer may adhere the first layer 110 to the barrier layer 130.

In embodiments, the thickness of the tie layer 120 may be from about 20 microns to about 200 microns. In additional embodiments, the thickness of the tie layer 120 may be from about 20 microns to about 150 microns, from about 20 microns to about 100 microns, from about 20 microns to about 50 microns, from about 50 microns to about 200 microns, from about 50 microns to about 150 microns, from about 50 microns to about 100 microns, from about 100 microns to about 200 microns, from about 100 microns to about 150 microns, or from about 150 microns to about 200 microns.

In embodiments, the multilayer structure 100 may further include pigments, antioxidants, inorganic fillers, other olefin-based elastomers, plastomers, styrenic block copolymers, and combinations thereof might be added, which may increase the impact resistance of the multilayer structure 100.

Figure 2:
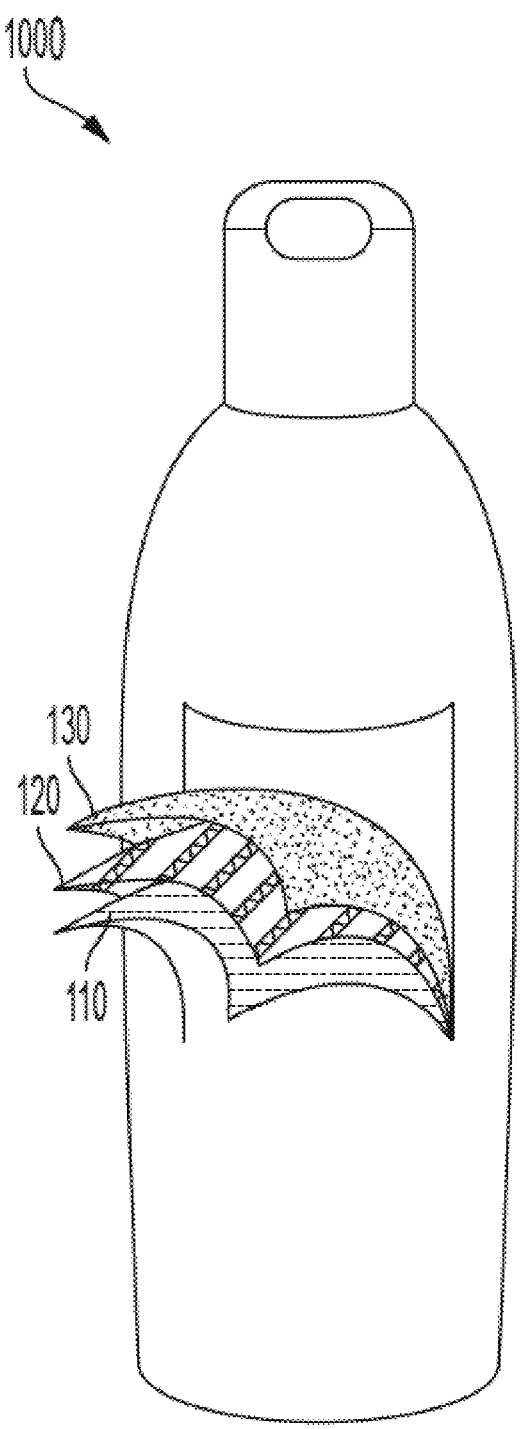
FIG. 2 is a schematic, partially cross-sectional side view of a multilayer article, in accordance with one or more embodiments of the present disclosure.

Another embodiment of the present disclosure includes, among other things, an multilayer article 1000 produced from the multilayer structure 100, such as the exemplary multilayer bottle depicted in FIG. 2. In some embodiments, the multilayer article 1000 may be a molded or a fabricated article. The article may comprise an injection-molded film, an injection-molded article, a blown film, a blow molded article, a molded article, a melt-spun fiber, or an extruded article.

The multilayer article 1000 may, in some embodiments, be a blow molded article comprising the multilayer structure 100. In some embodiments, the multilayer article 1000 may be a blow molded bottle, container, closure device, carton, canister, bottle cap, beverage closure device, package form from the multilayer structure 100. In some embodiments, the multilayer article 1000 may be a blow-molded bottle or, more specifically, a blow-molded barrier bottle. In one or more embodiments, the multilayer article 1000 may have advantageous or desirable properties. For instance, the multilayer article 1000 may, among other things, provide improved barrier properties, sufficient stiffness, and reduced article weight.

The multilayer article 1000 may be formed through a variety of processes, including but not limited to extrusion blow molding (EBM), injection blow molding (IBM) and compression blow forming (CBF) processes. Embodiments of the disclosure also relate to methods of making a multilayer article by forming a multilayer structure 100 into a bottle using at least one of an extrusion blow molding process, an injection blow molding process, or a compression blow molding process. The multilayer structure 100 may be in accordance with any of the embodiments previously described.

In some embodiments, the multilayer article 1000 may be an extrusion blow molded article, such as an extrusion blow molded bottle, including bottles for use in the agrochemicals industry. Embodiments of the disclosure may additionally relate to methods of forming a multilayer structure 100 into a multilayer article 1000, such as a bottle, by using an extrusion blow molding process. Without being bound by any particular theory, extrusion blow molding refers to a process in which plastic is melted and extruded into a hollow tube, referred to as a parison. The parison is then captured by closing it into a cooled metal mold. Air may then be blown into the parison to inflate it into the shape of the hollow article, such as a hollow bottle, container, or other object. After the plastic has sufficiently cooled, the mold is opened and the produced article is ejected.

Similarly, in some embodiments, the multilayer article 1000 may be an injection blow molded article, such as an injection mold molded bottle, including bottles for use in the agrochemicals industry. Embodiments of the disclosure may additionally relate to methods of forming a multilayer structure 100 into a multilayer article 1000, such as a bottle, by using an injection blow molding process. Without being bound by any particular theory, injection blow molding refers to a process in which large quantities of hollow glass and plastic objects may be made that includes three main steps: injection, blowing, and ejection. First, a polymer may be injection molded onto a core pin that is rotated to a blow molding station to be inflated and cooled. The injection blow molding machine may be based on an extruder barrel and screw assembly that may melt the polymer. The molten polymer may then be fed into a hot runner manifold and may be injected through nozzles into a heated cavity and core pin. The cavity mold may form the external shape of the preform and may be clamped around a core rod that forms the internal shape of the preform. The preform may consist of a fully-formed bottle or jar neck with a thick tube of polymer attached that will form a body, similar in appearance to a test tube with a threaded neck. Next, the preform mold may be opened and the core may be rotated and clamped into the hollow, chilled blow mold. The end of the core rod may open, allowing compressed air into the preform to inflate it into the finished article shape. Finally, after a cooling period, the blow mold may be opened and the core rod may be opened to an ejection position. The finished multilayer article 1000 may be stripped off of the core rod and optionally may be leak-tested prior to packaging. The produced multilayer article 1000, such as a bottle, may in some embodiments have numerous cavities, as machines typically utilize at least three core rods to allow concurrent preform injection, blow molding, and ejection.

In some embodiments, the multilayer article 1000 may be a compression blow formed article, such as a compression blow formed bottle, including bottles for use in the agrochemicals industry. Embodiments of the disclosure may relate to methods of forming a multilayer structure 100 into an multilayer article 1000, such as a bottle, by using a compression blow forming process. Without being bound by any particular theory, compression blow forming refers to a process that allows producers to obtain a container directly from granulated material based on a unique, innovative thermoplastic material conversion process. The conversion process is based on the continuous extrusion of plastic material, which is cut into doses of a predetermined size, referred to as gobs. The gobs may then be placed in an open mold and molded into a preform through a compression process. Inside the mold the preform may be thermoregulated to a temperature that allows stretch-blow molding to form a multilayer article 1000. The articles, which may in some embodiments be bottles, may then exit the machine in an orderly line.

Another embodiment of the present disclosure includes, among other things, an recycling method of producing a recycled structure from the multilayer structure 100. In various embodiments, methods for making a recycled structure may include converting the multilayer structure 100 into flakes, optionally converting the flakes into pellets, and forming a recycled structure from the flakes or the pellets. The recycled structure can be formed from the flakes and/or pellets by undergoing any useful process known to those skilled in the art. These processes include, but are not limited to an extrusion process, a blown-film process, a cast-film process, and combinations thereof.

In embodiments, methods for making a recycled structure may not include adding a separate compatibilizer component during the recycling process. Without being bound by theory, it is believe that the "built in" compatibilizer incorporated into the first layer 110 of the multilayer structure 100 may provide compatibility between the polar and non-polar polymers in the layers of the multilayer structure 100, allowing for improved recyclability of the multilayer structure 100 without the need for incorporating a separate compatibilizer component during the recycling process.

Embodiments of the recycled structure may have a notched Izod impact resistance greater than about 700 J/m when measured at 23° C. according to ASTM D256. In other embodiments, the recycled structure may have a notched Izod impact resistance greater than about 600 J/m or 500 J/m when measured at 23° C. and according to ASTM D256. Embodiments of the recycled structure may have a notched Izod impact resistance greater than about 500 J/m when measured at 30° C. according to ASTM D256. In other embodiments, the recycled structure may have a notched Izod impact resistance greater than about 400 J/m or 300 J/m when measured at 30° C. according to ASTM D256.

Embodiments of the recycled structure may have a polyamide particle size of less than 2 μm when observed via transmission electron micrograph. In other embodiments, the recycled structure may have a polyamide particle size of less than 1.5 μm, 1.0 μm, 0.5 μm, or 0.3 μm when observed via transmission electron micrograph. Without being bound by theory, it is believed that the lower particle size indicates a higher level of compatibilization achieved for the recycled structure.

Test Methods

The test methods include the following:

Melt Index ($I_2$)

To test the melt index ($I_2$), ethylene-based polymer samples are measured according to ASTM D1238 at 190° C. at 2.16 kg. The values are reported in g/10 min, which corresponds to grams eluted per 10 minutes. Propylene-based polymers are measured according to ASTM D1238 at 230° C. at 2.16 kg.

Density

To test the density, samples are prepared and measured according to ASTM D4703 and reported in grams/cubic centimeter (g/cc or g/cm$^3$). Measurements are made within one hour of sample pressing using ASTM D792, Method B.

Flexural Modulus (ksi)

To test the flexural modulus, samples are prepared and measured according to ASTM D790 and reported in kilopounds per square inch (ksi).

Stress at Yield (psi)

To test the stress at yield, samples are prepared and measured according to ASTM D638 and reported in pounds per square inch (psi).

Notched Izod Impact at 23° C. (J/m)

To test the notched izod impact, samples are prepared and measured according to ASTM D256. and reported in Joules per meter (J/m).

Notched Izod Impact at −30° C. (J/m)

To test the notched izod impact, samples are prepared and measured according to ASTM D256 and reported in J/m.

Melt Viscosity at 177° C. (cP)

The melt viscosity of the samples are measured according to ASTM D3236 at 177° C. The values are reported in cP. Additionally, the melt viscosity of the sample may be calculated using the melt index using the following equation:

$$I_2(190° C./2.16\ kg) = 3.6126[10^{(log(\eta)-6.6928)/-1.1363}]31\ 9.31851,$$

where η=melt viscosity, in cP, at 177° C.

EXAMPLES

The following examples illustrate features of the present disclosure but are not intended to limit the scope of the disclosure. The following experiments analyzed the performance of embodiments of the multilayer structures described herein.

Example 1

In Example 1, blends were produced and tested to simulate the recycling process and final compositions that would result from the recycling of the presently-disclosed multilayer structures. The raw materials utilized to produce Sample 1 and Comparative Samples A-C are provided in Table 1.

TABLE 1

Materials used in Sample 1 and Comparative Samples A, B, C.

| Material | Manufacturer | Density (g/cm$^3$) | Melt Index (g/10 min) | Melt Viscosity at 177° C. (cP) |
|---|---|---|---|---|
| HDPE 40055L | The Dow Chemical Company | 0.953 | 0.1 | 1,677,378 |
| Ultramid C40L | BASF SE | 1.120 | | |
| AMPLIFY ™ TY 1060H | The Dow Chemical Company | 0.870 | 3.0 | 1,223,002 |
| RETAIN ™ 3000 | The Dow Chemical Company | 0.870 | 660 | 13,000 |
| AMPLIFY ™ TY 1353H | The Dow Chemical Company | 0.921 | 2.0 | 1,346,505 |

To produce each sample tested in this Example, the raw materials were dried and compounded into a blend prior to being fed into an extruder. To insure that the raw materials were sufficiently dry before compounding, the samples were placed into an oven and dried at 70° C. with no humidity for 24 hours. The composition of each blend produced for Comparative Samples A-C and Sample 1 are shown in Table 2.

TABLE 2

Composition of Sample 1 and Comparative Samples A, B, C.

| Materials | Comparative A | Comparative B | Comparative C | Sample 1 |
|---|---|---|---|---|
| HDPE 40055L | 94 wt. % | 91.8 wt. % | 88.5 wt. % | 91.7 wt. % |
| PA Ultramid C40L | 6 wt. % | 6 wt. % | 6 wt. % | 6 wt. % |
| AMPLIFY ™ TY 1060H | — | — | — | 2.3 wt. % |
| RETAIN ™ 3000 | — | 2.2 wt. % | 1.5 wt. % | — |
| AMPLIFY ™ TY 1353H | — | — | 4 wt. % | — |

Comparative Sample A represents a conventional, commercial composition for multilayer article (i.e. a bottle), which includes only an HDPE and a polyamide. Comparative Sample B represents a multilayer article that includes a maleic anhydride-grafted functional polymer with a melt viscosity less than 200,000 cP, when measured at 177° C. Comparative Sample C represents a multilayer article with a blend of a maleic anhydride-grafted functional polymer with a melt viscosity less than 200,000 cP, when measured at 177° C. and a maleic anhydride-grafted functional polymer with a density higher than 0.910 g/cc. Sample 1 represents a multilayer article according to presently-disclosed embodiments.

For Sample 1 and Comparative Samples A-C, the amount of compatibilizer in each formulation was defined to achieve a fixed maleic anhydride content of 0.026 wt. %, based on the total weight of the formulation. In the present Example, the blends of Sample 1 and Comparative Samples A-C analyze the effects of various compatibilizers on the polar and polyolefin components. It should be noted that for a commercial multilayer article (i.e. a bottle), a tie-layer would typically be added in between a polar layer and a polyolefin layer. However, during production of the multilayer article (i.e. the bottle), the anhydride functional groups of any tie layer(s) would react with the polar polymer (i.e., polyamide). Because the anhydride functional groups of the tie layer(s) already reacted during production of the original multilayer article, during the recycling process, it is believed that the anhydride content available from any tie layer(s) would not be available to act as a compatibilizer in the recycled blend formulation. Therefore, it is believed that any tie layer(s) of the multilayer article may likely have a minor effect on the compatibilization of the other components of the recycled blend.

Trials were then performed using a Coperion ZSK 26 twin screw extruder to compound the blends of Example 1. The barrel length was 100 mm per with 15 barrels comprising the entire process section. The screw diameter was 25.5 mm with a flight depth of 4.55 mm. The feed rate was 15 lbs/hr and the screw RPM was 300. Table 3 provides the temperature profile that was used.

TABLE 3

Temperature Profile of Example 1.

| | Extruder Zone | | | | | | | | |
|---|---|---|---|---|---|---|---|---|---|
| | 1 | 2 | 3 | 4 | 5 | 6 | 7 | 8 | Die |
| Set Temperature (° C.) | 100 | 180 | 240 | 240 | 240 | 240 | 240 | 240 | 240 |

The blends of Sample 1 and Comparative Samples A-C were pelletized, and the pellets were molded into 3-mm thick compression plaques according to ASTM D4703. The plaques were then tested to measure their mechanical properties, and microscopy techniques were employed to determine the disperse phase particle size for each sample. The mechanical and impact properties of Sample 1 and Comparative Samples A-C are provided in Table 4.

TABLE 4

Mechanical and impact properties of Samples 1, 2 and Comparative Samples A, B, C.

| Properties | Method | Comp. A | Comp. B | Comp. C | Sample 1 |
|---|---|---|---|---|---|
| Melt Index 190° C./21.6 kg (g/10 min) | ASTM D1238 | 15.9 | 12.8 | 10.8 | 10.6 |
| Flexural Modulus (ksi) | ASTM D790 | 195.1 | 171.8 | 188.5 | 180.2 |

TABLE 4-continued

Mechanical and impact properties of Samples 1, 2 and Comparative Samples A, B, C.

| Properties | Method | Comp. A | Comp. B | Comp. C | Sample 1 |
|---|---|---|---|---|---|
| Stress at Yield (psi) | ASTM D638 | 4102 | 4274 | 4008 | 4216 |
| Notched Izod Impact at 23° C. (J/m) | ASTM D256 | 225 | 360 | 427 | 774 |
| Notched Izod Impact at −30° C. (J/m) | ASTM D256 | 70 | 109 | 232 | 502 |
| Polyamide particle size via TEM (μm) | | 1.29 | 0.3 | 0.4 | 0.22 |

As stated previously in this disclosure, multilayer structures, such as multilayer bottles, may have poor recyclability due to the lack of compatibility between the polar and non-polar polymers composition. As shown in Table 4, Sample 1 exhibited a notched Izod impact at 23° C. that was 3.44 times than Comparative Sample A, 2.15 times higher than Comparative Sample B, and 1.81 times higher than Comparative Sample C. Furthermore, Sample 1 exhibited a notched Izod impact at 30° C. that was 7.17 times than Comparative Sample A, 4.60 times higher than Comparative Sample B, and 2.16 times higher than Comparative Sample C.

Figure 3:
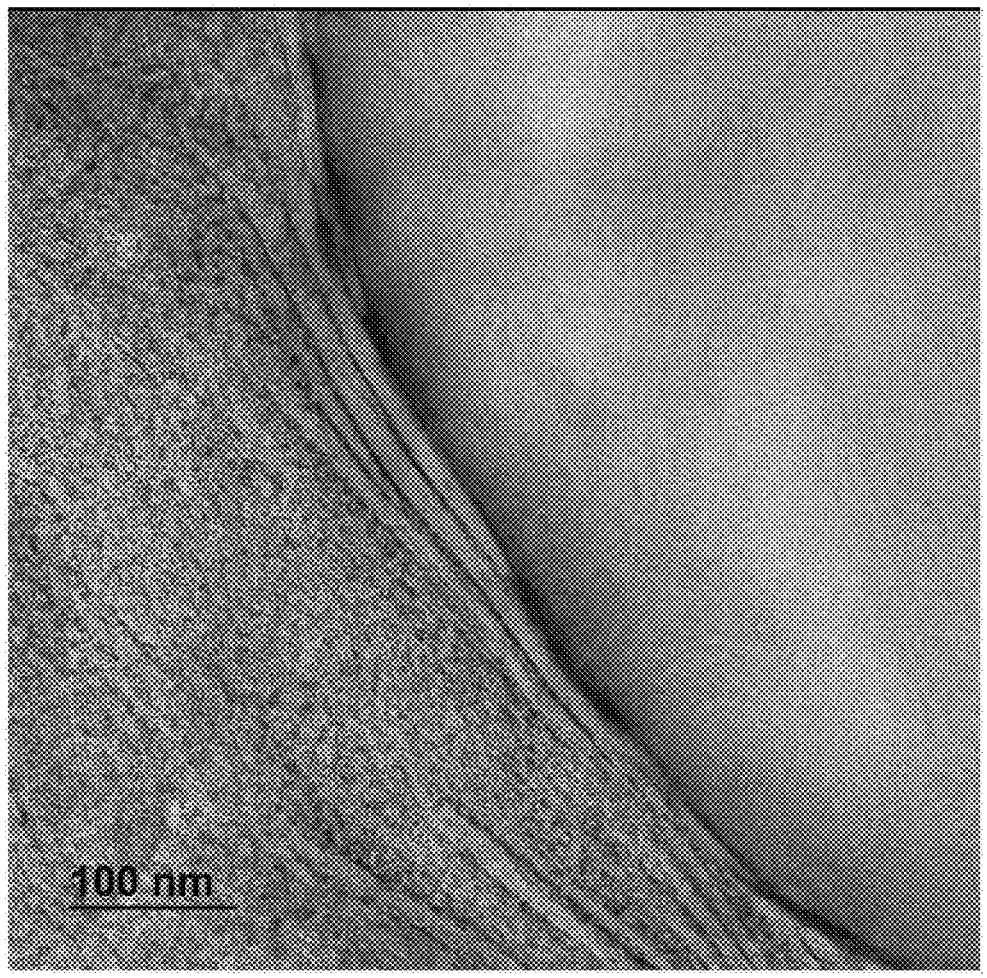
FIG. 3 is a transmission electron micrograph of Comparative Sample A.
Figure 4:
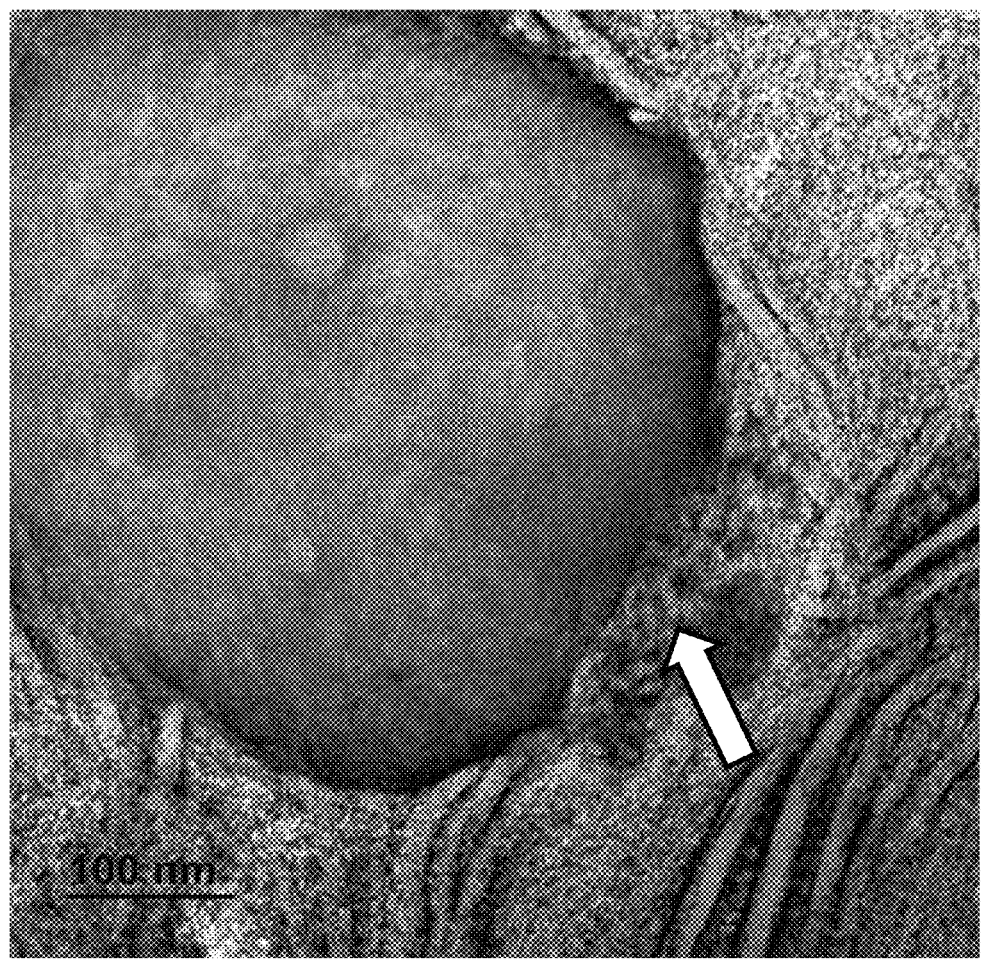
FIG. 4 is a transmission electron micrograph of Comparative Sample B.
Figure 5:
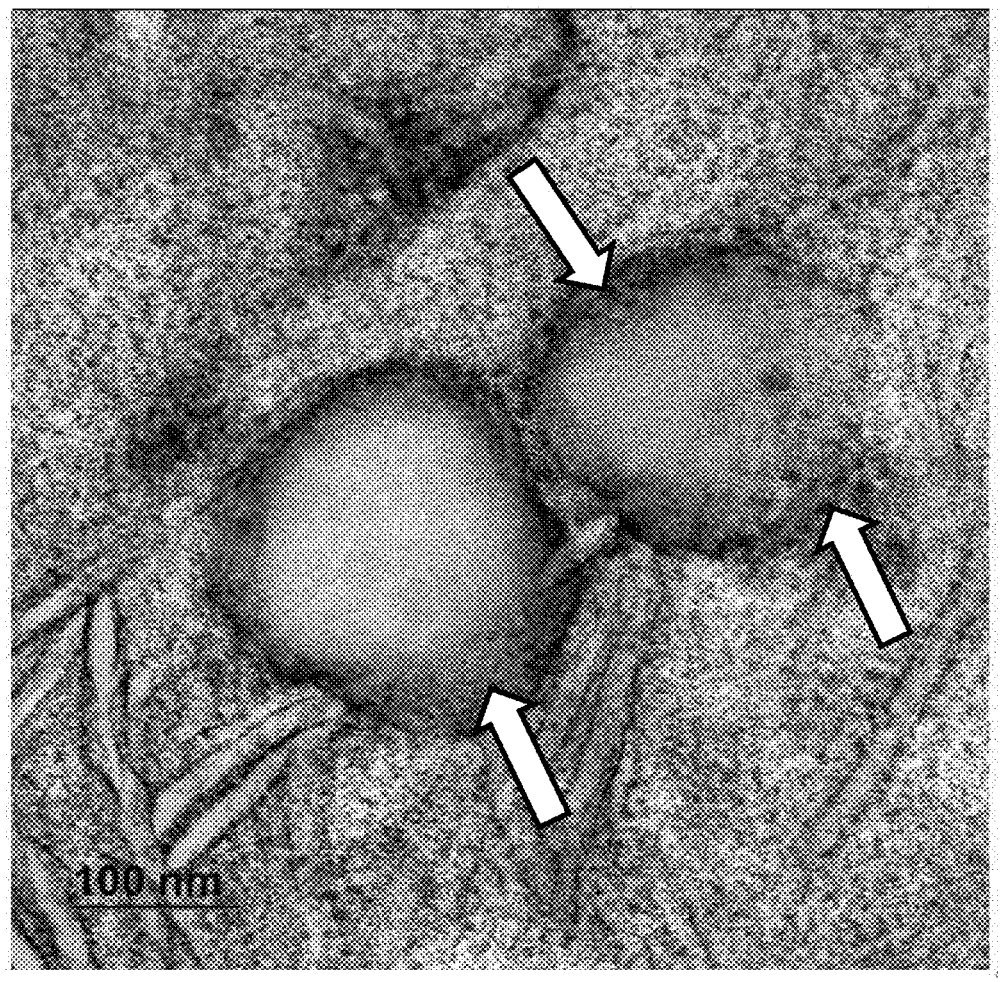
FIG. 5 is a transmission electron micrograph of Sample 1, in accordance with one or more embodiments of the present disclosure.

FIGS. 3-5 show the micrographs of Comparative Sample A (FIG. 3) and Comparative Sample B (FIG. 4) and Sample 1 (FIG. 5). As shown above in Table 4 and confirmed in FIG. 5, Sample 1 had the lowest particle size when compared with Comparative Sample A (FIG. 3) and Comparative Sample B (FIG. 4). It is believed that the lower particle size indicates a higher level of compatibilization achieved for Sample 1, which also corroborates with higher mechanical impact observed for Sample 1 (see Table 4).

It will be apparent that modifications and variations are possible without departing from the scope of the disclosure defined in the appended claims. More specifically, although some aspects of the present disclosure are identified herein as preferred or particularly advantageous, it is contemplated that the present disclosure is not necessarily limited to these aspects.

The invention claimed is:

1. A multilayer structure comprising:
   a first layer comprising, based on the total weight of the first layer:
      from 90 wt. % to 99.5 wt. % of an ethylene/alpha-olefin interpolymer having a density of from 0.945 g/cc to 0.970 g/cc, and
      from 0.5 wt. % to 10 wt. % of a compatibilizer, the compatibilizer comprising an anhydride and/or carboxylic acid functionalized ethylene/alpha-olefin elastomer having a density of from 0.850 g/cc to 0.910 g/cc and a melt viscosity of greater than 200,000 cP, when measured at 177° C.; and
   a barrier layer comprising a polyamide, an ethylene vinyl alcohol, or combinations thereof.

2. The multilayer structure of claim 1, wherein the anhydride and/or carboxylic acid functionalized ethylene/alpha-olefin elastomer has a melt viscosity of from 200,000 cP to 3,000,000 cP, when measured at 177° C.

3. The multilayer structure of claim 1, wherein the barrier layer comprises a polyamide selected from the group consisting of nylon 6, nylon 66, nylon 6/66, and combinations thereof.

4. The multilayer structure of claim 1, wherein the barrier layer comprises ethylene vinyl alcohol.

5. The multilayer structure of claim 1, wherein barrier layer has a thickness of from 10 microns to 100 microns.

6. The multilayer structure of claim 1, wherein the first layer has a thickness of from 300 microns to 2500 microns.

7. The multilayer structure of claim 1, wherein the anhydride and/or carboxylic acid functionalized ethylene/alpha-olefin elastomer is an anhydride functionalized ethylene/alpha-olefin elastomer.

8. The multilayer structure of clam 1, further comprising a tie layer disposed between the first layer and the barrier layer, wherein the tie layer comprises an anhydride-grafted ethylene/alpha-olefin interpolymer.

9. The multilayer structure of claim 8, wherein the anhydride and/or carboxylic acid functionalized ethylene/alpha-olefin interpolymer has a melt viscosity of less than or equal to 200,000 cP.

10. A multilayer article formed from the multilayer structure of claim 1.

11. The multilayer article of claim 10, wherein the article is a bottle.

12. A method for making a recycled structure, the method comprising:
   converting a multilayer structure into flakes, the multilayer structure comprising a first layer comprising, based on the total weight of the first layer:
      from 90 wt. % to 99.5 wt. % of an ethylene/alpha-olefin interpolymer having a density of from 0.945 g/cc to 0.970 g/cc, and
      from 0.5 wt. % to 10 wt. % of a compatibilizer, the compatibilizer comprising an anhydride and/or carboxylic acid functionalized ethylene/alpha-olefin elastomer having a density of from 0.850 g/cc to 0.910 g/cc and a melt viscosity of greater than 200,000 cP, when measured at 177° C.; and
   a barrier layer comprising a polyamide, an ethylene vinyl alcohol, or combinations thereof; and
   forming the flakes into the recycled structure.

13. The method of claim 12, further comprising converting the flakes into pellets and forming the pellets into the recycled structure.

14. A method of producing a recycled bottle comprising:
   compounding an ethylene/alpha-olefin interpolymer having a density of from 0.945 g/cc to 0.970 g/cc; an anhydride and/or carboxylic acid functionalized ethylene/alpha-olefin elastomer having a density of from 0.850 g/cc to 0.910 g/cc and a melt viscosity of greater than 200,000 cP, when measured at 177° C.; and a polyamide to produce a blend; and
   blow-molding the blend into a bottle.

15. The method of claim 14, wherein the bottle has a polyamide particle size of less than 0.3 μm when measured by transmission electron microscopy.

* * * * *